July 1, 1924.

T. RITCHIE

STOCK WATERING DEVICE

Filed June 4, 1923

Inventor
T. Ritchie
By Geo. P. Kimmel, Attorney

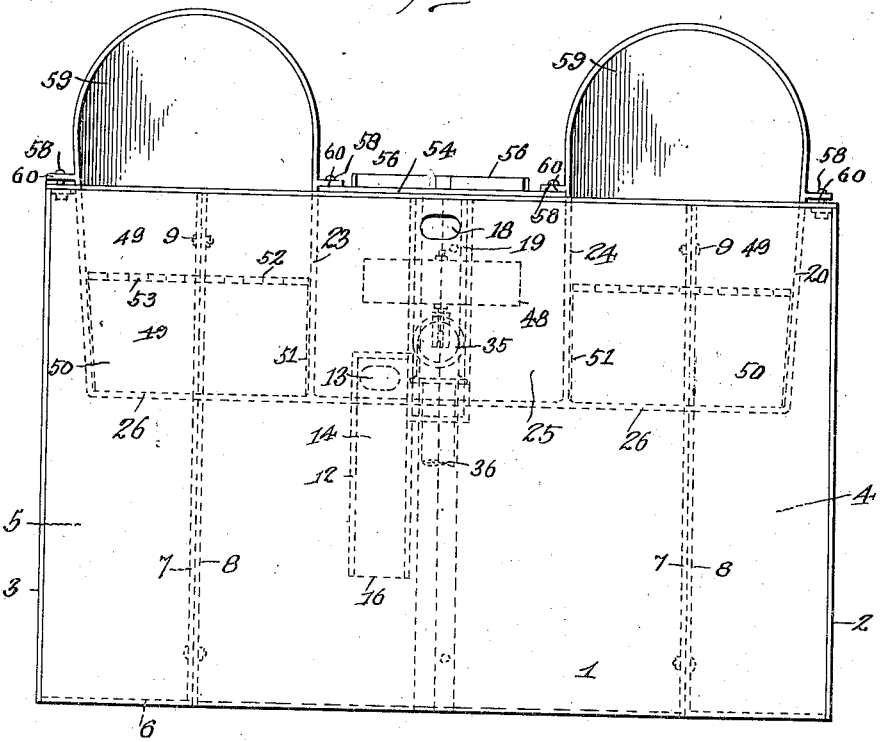
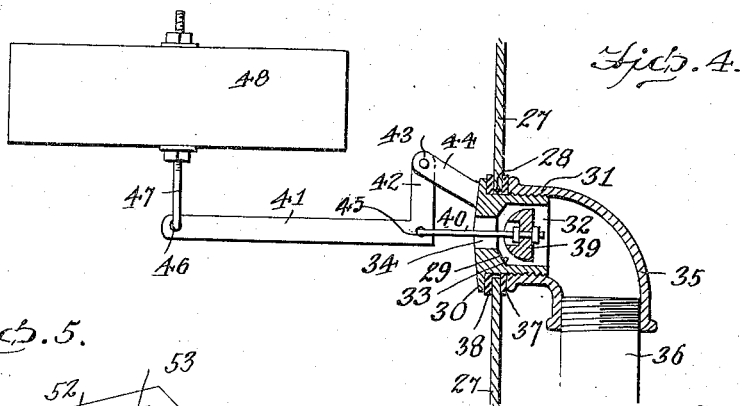
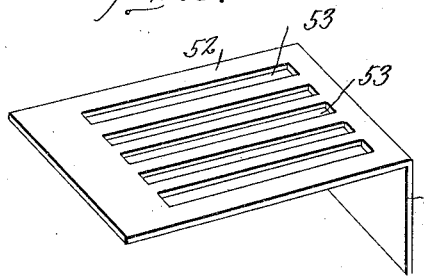

Patented July 1, 1924.

1,499,999

UNITED STATES PATENT OFFICE.

THOMAS RITCHIE, OF CEDAR, IOWA, ASSIGNOR TO ROBERT H. RITCHIE, OF OSKALOOSA, IOWA.

STOCK-WATERING DEVICE.

Application filed June 4, 1923. Serial No. 643,378.

*To all whom it may concern:*

Be it known that I, THOMAS RITCHIE, a citizen of the United States, residing at Cedar, in the county of Mahaska and State of Iowa, have invented certain new and useful Improvements in Stock-Watering Devices, of which the following is a specification.

This invention relates to a stock watering device, and has for its object to provide a device of such class, in a manner as hereinafter set forth, with means to provide a plurality of water containing troughs for drinking purposes automatically supplied with water when the body of water in the trough is below a predetermined level and also when the animals are drinking therefrom, and further providing each of the troughs with a grated element constituting a false bottom and providing each trough with an upper and a lower compartment, the upper compartment being employed for drinking purposes and the lower compartment for the reception of mud or sediment delivered to the trough by the animals when drinking, the said grated element constituting a cleaning means for a trough, as when mud or sediment is deposited in an upper compartment by an animal when drinking, the mud or sediment will precipitate through the grated element into the lower compartment, or be washed from the grated element into the lower compartment during the supplying of water to the trough, under such conditions providing at all times clean drinking water for the animals.

A further object of the invention is to provide, in a manner as hereinafter set forth, a stock watering device including means to provide a plurality of water containing troughs for drinking purposes and further with means for not only heating a water feed pipe leading to the troughs for supplying water thereto, but also the troughs, and furthermore, providing means for controlling the supply of water to each of the troughs in such a manner that after the body of water within each trough has fallen below a predetermined level, the water feed will be automatically opened for replenishing the troughs, and to further divide each of the troughs into a drinking compartment and a collecting compartment so that on the supply of water to either one of the troughs the drinking compartment will be cleaned of mud or sediment and the latter forced into the collecting compartment.

Further objects of the invention are to provide a stock watering device which is simple in its construction and arrangement, strong, durable, readily assembled, thoroughly efficient in its use, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 2 is a front elevation thereof.

Figure 4 is a side elevation, partly in section, illustrating water feed controlling mechanism.

Figure 5 is a perspective view of the grated element providing the false bottom or partition member for the drinking trough.

Figure 1:
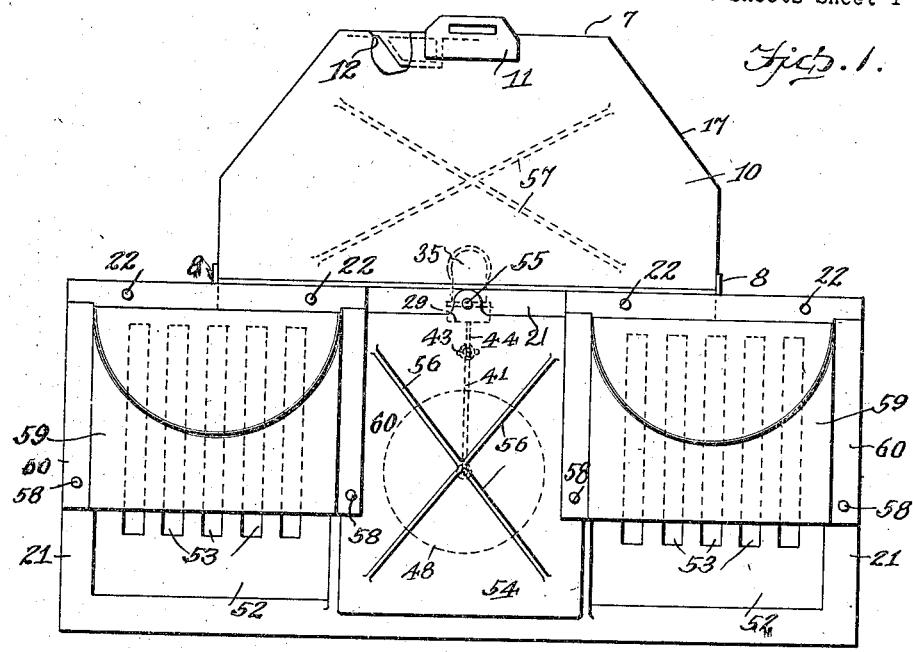
Figure 1 is a top plan view of a stock watering device, in accordance with this invention.
Figure 3:
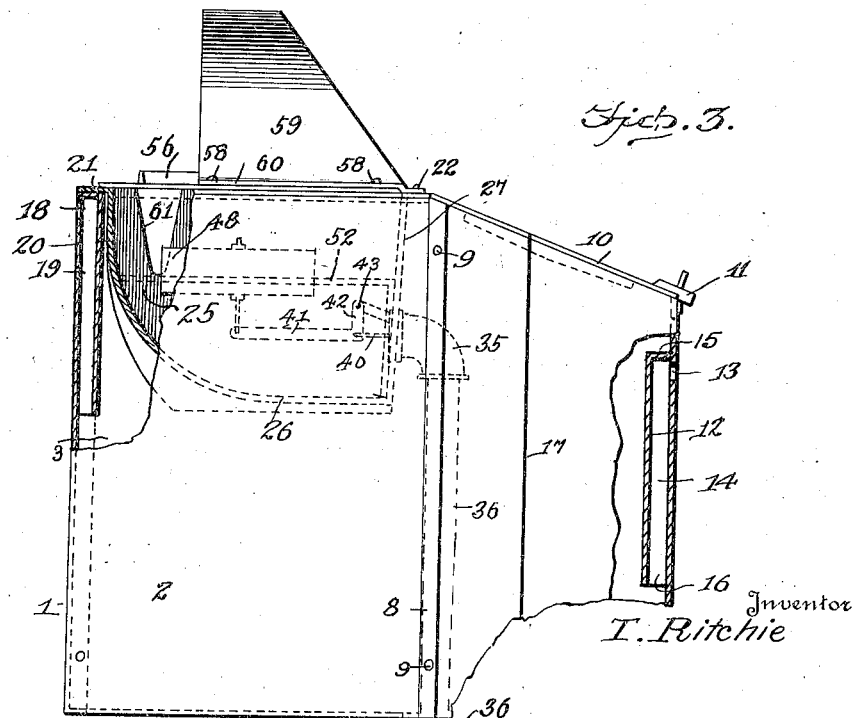
Figure 3 is a fragmentary sectional view looking towards one side of the device.

Referring to the drawings in detail, a stock watering device, in accordance with this invention, comprises a primary supporting casing formed of a front wall 1, a pair of end walls 2, 3, and a rear wall consisting of two sections 4, 5. The primary supporting casing further includes a bottom 6, and said casing is rectangular in contour and of any suitable height.

The device further includes what may be termed a secondary casing and which extends rearwardly from the primary casing. The secondary casing is indicated at 7, and is of less length than the length of the primary casing and said casing 7 is open at its front and communicates with the primary casing at the rear of the latter. The casing 7 is positioned against the primary casing between the sections 4, 5, of the rear wall of said primary casing, and the said sections 4, 5 are provided with rearwardly extending flanges 8, between which the casing 7 is positioned and to which the casing 7 is secured by the hold-fast devices 9. The top of the casing 7 inclines downwardly from front to rear, and said casing 7 is formed with a removable closure 10, connected with the body portion of the casing in any suitable manner, as illustrated at 11.

The rear wall of the casing 7 is indicated at 12, and formed below the top thereof with an opening 13, and said wall 12 has formed integral with its inner face, means to provide a vertically disposed draft passage 14, which is closed at its top, as at 15 and open at its bottom as at 16. The closed top 15 of the passage 14, is arranged above the opening 13. The passage 14 is of less length than the height of the wall 12, communicates with the opening 13, terminates at a point removed from the top of said wall 12 and also at a point removed from the bottom of said wall 12. The rear portion of the casing 7 is tapered, as indicated at 17, and said casing 7 is provided with a bottom, which if desired, can form a continuation of the bottom 6.

The front wall 1, of the primary casing, centrally thereof, and in proximity to its top, is provided with an opening 18 and the inner face of said front wall 1, centrally thereof, is provided with means to constitute a draft passage 19, having a closed top and open bottom and with the closed top above the opening 18. The lower end of the passage 19 is positioned, preferably above, the center of the front wall 1. The passage 19 communicates with the opening 18.

Suspended within the primary supporting casing, from the top of the latter, is a receptacle comprising a rectangular body portion 20, flanged throughout at its top, as at 21, and with the flange 21 seated upon and secured to the top of the primary casing by the hold-fast devices 22. The body portion 20 of the receptacle, is formed with a pair of transverse partitions 23, 24, providing centrally a water chamber 25, and at each end a drinking trough 26 of the same depth as the water chamber.

The rear wall of the body portion 20, and which inclines forwardly is indicated at 27, is provided centrally with an opening 28, and extending through said opening 28 is a valve housing 29, formed at one end with a flange 30 and further provided with peripheral threads 31. The housing 29 is set up to form a valve chamber 32, a valve seat 33 and a water feed port 34 which opens into the water chamber 25. The valve housing 29 extends into the casing 7, and has secured to the peripheral threads thereof, a depending elbow 35, which has connected therewith a depending water feed pipe 36 which extends down through the bottom of the casing 7 to a suitable source of water supply.

Interposed between the upper end of the elbow 35 and the wall 27 is a gasket 37, and interposed between the flange 30 and the wall 27 is a gasket 38.

Arranged within the valve chamber 32 is a valve 39, preferably of semi-globular contour, and which has secured thereto, in any suitable manner, one end of a valve stem which projects through the port 34 and into the water chamber 25.

The valve 39 is controlled through the medium of a float actuated shifting mechanism and the latter consists of an L-shaped lever formed of a long arm 41 and a short arm 42. The arm 41 is disposed horizontally and at right angles with respect to the arm 42, which is disposed vertically, and which has its upper end pivotally connected, as at 43, to a support 44, which is formed integral with and projects upwardly at an inclination from the top of the housing 29. The lower end of the arm 42 is connected, as at 45, to the forward end of the valve stem 40. The forward end of the arm 41 is connected, at at 46, to the lower end of a float operated bar 47, which is attached to a float 48.

The float 48 and L-shaped lever are arranged within the water chamber 25, so that on the rise and fall of the water within said chamber 25 the L-shaped lever will be actuated thereby operating the valve stem 40 to open and close the valve 39 for the purpose of controlling the feed of water from the pipe 36, through the port 34 to the chamber 25.

Each of the troughs 26 is provided with a false bottom or a partition, to provide an upper compartment 49 and a lower compartment 50, and the former is what may be termed a drinking chamber and the latter a collecting chamber. The false bottom or partition, best shown in Figure 5, is angle-shaped in contour, and comprises a vertically disposed portion 51 and a horizontally disposed portion 52, which is formed with substantially elongated, lengthwise extending, parallel rectangular slots 53. The length of the portion 52 is greater than the height of the portion 51, and when the false bottom or partition is arranged in the trough, the portion 51 is seated on the bottom of the trough and the side of the trough snugly engages the side edges of the portion 52. The false bottom or partition, not only divides the trough into a drinking chamber and collecting chamber, but further constitutes what may be termed a cleaning element for the drinking chamber, and is so set up whereby after one animal drinks, all mud or sediment delivered by the animal to the drinking chamber 49, is discharged or removed therefrom on the supply of water to said drinking chamber, due to the fact that as the water enters the drinking chamber the mud or sediment will be washed through the slots 53, into the collecting chamber and by this arrangement clean drinking water is provided at all times for the animals. The slots 52 are of a width to prevent the animals' feet from slipping therethrough and as the side edges of the false bottom or partition are engaged by the side walls of the trough, the animals' feet cannot slip between said edges and said wall.

The water chamber 25 is closed through the medium of a cover plate 54, secured to the flange 21, as at 55.

The outer face of the cover plate is provided with reinforcing ribs 56, and the inner face of the closure 10 has reinforcing ribs 57.

Secured over each of the drinking chambers 49, by the hold-fast devices 58 is a hood 59, open at its front and closed at its rear and which provides means to prevent animals from walking over the top of a trough and also as a directing means for the animals. The hoods 59 are flanged, as at 60 and through the flanges are the hold-fast devices 58.

The inner flanges of the hoods 59 extend on the closure 54. The primary supporting casing, as well as the casing 7, provides a heating chamber and in which can be arranged a lamp or any other suitable heating element or heating means and as the feed pipe extends down through the heating chamber it can be heated as well as the receptacle which provides the troughs and the water chambers. The openings 13 and 15 in connection with the passages 14 and 19, set up means to provide for a draft through the heating chamber.

The partition 23, as well as the partition 24, at the upper portion and near the front thereof, is provided with a V-shaped cut away portion 61 for establishing communication between each of the drinking chambers 59 and the water chamber 23. The lower end of each of the cutaway portions 61, these latter constituting what may be termed supply ports, is arranged in close proximity to the portion 52 of the false bottom or partition within the trough 26, so that when the body of water falls within each of the drinking chambers below a predetermined level a supply of water will be had from the water chamber 25, cleaning the false bottom, and the supply will be continued until the float 48 rises the necessary distance to close the valve 39, thereby shutting off the pipe 36 to the water chamber 25.

From the foregoing construction and arrangement of parts, an original, novel and improved structure of watering device is set up, and although the preferred embodiment of the invention is as described and illustrated, yet it is to be understood that changes in the details of construction can be had which will fall within the light of the invention as claimed.

What I claim is:—

1. A stock watering device comprising a housing, an open top receptacle suspended therein and providing in connection therewith a heating chamber, said receptacle having a pair of integral transversely extending spaced partitions to form a centrally disposed water inlet chamber and a trough at each side of the chamber, said chamber and troughs of the same depth, each of said partitions having the upper portion thereof provided with means to provide for the supplying of water from the chamber to the troughs, a closure for the water chamber, and an angle shaped element mounted in each trough and including a rear vertically disposed supporting portion terminating at its upper end in a forwardly extending horizontally disposed portion arranged below said means and dividing the trough into an upper drinking and a lower dirt collecting chamber, the horizontal portion of said element being lengthwise slotted.

2. A stock watering device comprising a receptacle providing a pair of troughs separated by a water inlet chamber communicating therewith, a housing supporting and inclosing said receptacle, a ribbed closure plate for the water chamber, and a flanged hood extending over the rear of each trough, the flanges of each hood extending upon and secured to said closure plate and further extending upon and secured to the rear and one end of said receptacle.

3. A stock watering device comprising a trough formed with water inlet means, an angle-shaped element arranged within the trough and dividing it into an upper drinking chamber and a lower dirt collecting chamber, said element consisting of a vertically disposed supporting portion terminating at its upper end in a forwardly extending horizontally disposed portion provided with lengthwise extending slots, the length of said horizontally disposed portion being greater than the height of said vertically disposed portion, said vertically disposed portion seated on the bottom of the trough at the rear thereof.

I testimony whereof, I affix my signature hereto.

THOMAS RITCHIE.